US012014870B2

(12) United States Patent
Kumar et al.

(10) Patent No.: US 12,014,870 B2
(45) Date of Patent: Jun. 18, 2024

(54) AIR-CORE REACTORS FOR USE WITH POWER TRANSMISSION SYSTEMS

(71) Applicant: General Electric Technology GmbH, Baden (CH)

(72) Inventors: Amit Kumar, Stafford (GB); Henrique Borges Zaninelli, Itajuba (BR); Luiz Souza, Stafford (GB)

(73) Assignee: GE Infrastructure Technology LLC, Greenville, SC (US)

( * ) Notice: Subject to any disclaimer, the term of this patent is extended or adjusted under 35 U.S.C. 154(b) by 134 days.

(21) Appl. No.: 17/720,160

(22) Filed: Apr. 13, 2022

(65) Prior Publication Data

US 2023/0335324 A1 Oct. 19, 2023

(51) Int. Cl.

*H01F 7/16* (2006.01)
*H01F 7/08* (2006.01)
*H01F 7/127* (2006.01)
*H01F 27/28* (2006.01)

(52) U.S. Cl.

CPC ............... *H01F 7/16* (2013.01); *H01F 7/081* (2013.01); *H01F 7/127* (2013.01); *H01F 27/28* (2013.01); *H01F 2007/1692* (2013.01)

(58) Field of Classification Search

CPC ........................................................ H01F 7/16
USPC .......................................................... 307/24
See application file for complete search history.

(56) References Cited

U.S. PATENT DOCUMENTS 5,202,584 A * 4/1993 Burke .................... H01F 27/085 333/175
2019/0221354 A1* 7/2019 Yoshida ................ H02M 7/003

FOREIGN PATENT DOCUMENTS

EP 0529905 A1 3/1993
WO 2013091683 A1 6/2013
WO 2022006610 A1 1/2022

OTHER PUBLICATIONS

L. Souza et al.: A Novel Method to Provide Harmonics Damping to VSC-HVDC Converters. The 17th International Conference on AC and DC Power Transmission (ACDC 2021), 2021, pp. 56-60, 2021.
Extended European Search Report issued in EP Application No. 23167752.7 dated Aug. 25, 2023, 11 pages.

* cited by examiner

*Primary Examiner* — Joseph Chang
(74) *Attorney, Agent, or Firm* — Eversheds Sutherland (US) LLP

(57) ABSTRACT

Air-core reactors for use with power transmission systems are disclosed. An example air-core reactor may include a main coil and an auxiliary coil. The main coil may include a first solenoid having a first diameter and a second solenoid having a second diameter, wherein the first diameter and the second diameter are different. The auxiliary coil may include a third solenoid. The first solenoid and the second solenoid may be arranged concentrically. The auxiliary coil may also be magnetically coupled to the main coil, and the auxiliary coil may be arranged concentric to the main coil.

19 Claims, 7 Drawing Sheets

AIR-CORE REACTORS FOR USE WITH POWER TRANSMISSION SYSTEMS

FIELD OF DISCLOSURE

The present disclosure is related to air-core reactors, and more particularly to air-core reactors for use with power transmission devices.

BACKGROUND

Systems and methods for air-core reactors for use with power transmission devices are disclosed. High-voltage power transmission devices may require the connection of filters or other auxiliary circuits for various purposes. Presently, in order to connect the filters or other auxiliary circuits, additional equipment may be required to connect the filters or other auxiliary circuits to the high-voltage power transmission device. However, the use of additional equipment may not be desired due to additional costs associated with the use of such additional equipment.

BRIEF DESCRIPTION OF THE DRAWINGS

The detailed description is set forth with reference to the accompanying drawings. The drawings are provided for purposes of illustration only and merely depict exemplary embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
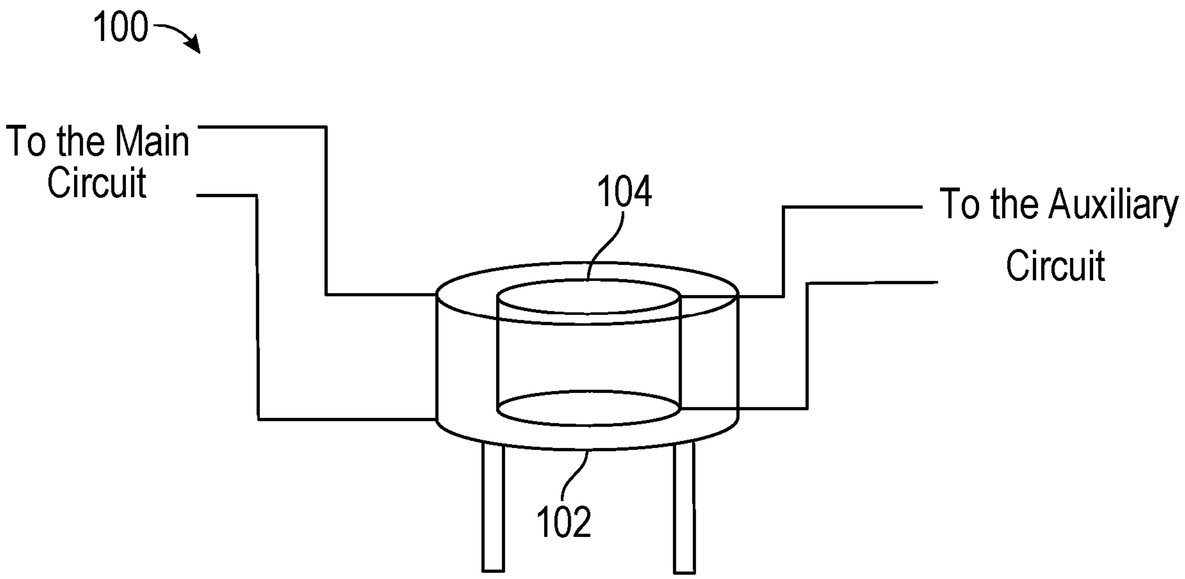
FIG. 1 depicts an example air-core reactor, in accordance with one or more example embodiments of the disclosure.

This disclosure relates to, among other things, air-core reactors for use with power transmission devices. In one or more embodiments, an example air-core reactor may include a main coil and an auxiliary coil. The main coil may include a first solenoid having a first diameter and a second solenoid having a second diameter, wherein the first diameter and the second diameter are different. The auxiliary coil may include a third solenoid. The first solenoid and the second solenoid may be arranged concentrically. The auxiliary coil may also be magnetically coupled to the main coil.

In one or more embodiments, the air-core reactors described herein may improve upon current methods for applications in power transmission systems, such as HVDC power converters. Air-core reactors are less costly, may be simple to construct, operate, and maintain, and they eliminate the need for oil in a reactor. Additionally, by using an air core, low-power auxiliary devices may be capable of connection to a magnetically-coupled auxiliary coil, which may avoid the need for additional high voltage and/or bulky components to be connected to a main circuit to perform the functions of the low-power auxiliary devices. Because a main coil may be magnetically coupled to an auxiliary coil, this configuration may allow for a necessary degree of coupling between the main coil and the auxiliary coil, even without an iron core. This technical solution thus allows for low-power auxiliary devices to be capable of connection to a magnetically-coupled auxiliary coil, which may avoid the need for additional high voltage and/or bulky components to be connected to a main circuit to perform the functions of the low-power auxiliary devices.

In one or more embodiments, the main coil may further comprise a fourth solenoid having a third diameter, wherein the first diameter, the second diameter, and the third diameter are different. In one or more embodiments, the first solenoid, the second solenoid, and the fourth solenoid are arranged concentrically.

In one or more embodiments, the main coil may be electrically connected to a main circuit of a power transmission system. In one or more embodiments, the auxiliary coil may be electrically connected to an auxiliary circuit of a power transmission system.

In one or more embodiments, the auxiliary circuit may comprise a band-pass filter configured to provide harmonic damping to a voltage source converter that is electrically connected to a main circuit of the power transmission system.

In one or more embodiments, the auxiliary circuit may comprise an LC circuit connected across a main circuit breaker.

In one or more embodiments, the auxiliary coil is isolated from the main coil.

In one or more embodiments, a system disclosed herein may include a power transmission system. The power transmission system may include an air core reactor comprising a main coil and an auxiliary coil. The main coil may include a first solenoid having a first diameter and a second solenoid having a second diameter, wherein the first diameter and the second diameter are different. The auxiliary coil may include a third solenoid. The first solenoid and the second solenoid may be arranged concentrically. The auxiliary coil may also be magnetically coupled to the main coil.

In one or more embodiments, a method of implementing an air-core reactor in a power transmission system may be disclosed herein. In one or more embodiments, the method may include arranging a first solenoid having a first diameter concentric to a second solenoid having a second diameter. In one or more embodiments, the method may further include disposing an auxiliary coil comprising a third solenoid magnetically coupled to a main coil, wherein the main coil comprises the first solenoid and the second solenoid. In one or more embodiments, the method may further include electrically connecting the main coil to a main circuit of the power transmission system. In other embodiments, the method may include electrically connecting the auxiliary coil to an auxiliary circuit of the power transmission system.

FIG. 1 depicts an example air-core reactor 100, in accordance with one or more example embodiments of the disclosure.

In one or more embodiments, an air-core reactor 100 may include a main coil 102 and an auxiliary coil 104. Although not depicted in FIG. 1, the main coil 102 may be formed of at least one solenoid. In some embodiments, the main coil 102 may comprise a first solenoid having a first diameter and a second solenoid having a second diameter. The first diameter and the second diameter may be different. In other embodiments, the main coil 102 may comprise a third solenoid having a third diameter. The third diameter may be different from the first diameter and the second diameter. In yet other embodiments, the main coil 102 may comprise additional solenoids. Any additional solenoids may have a different diameter than the first diameter, the second diameter, and the third diameter. In one or more embodiments, the first solenoid, the second solenoid, the third solenoid, and any additional solenoids may be spaced apart and arranged concentrically. In one or more embodiments, the first solenoid, the second solenoid, the third solenoid, and any additional solenoids may be connected either in parallel or in series.

In one or more embodiments, the auxiliary coil 104 may comprise an internal solenoid. In some embodiments, the auxiliary coil 104 may comprise more than one internal solenoid connected in parallel. In some embodiments, the auxiliary coil 104 may be isolated from the main coil 102. In some embodiments, the auxiliary coil 104 may be magnetically coupled to the main coil 102. In some embodiments, the auxiliary coil 104 may be arranged concentric to the main coil 102. In some embodiments, the auxiliary coil 104 may be of a similar diameter as to the main coil 102. In other embodiments, the auxiliary coil 104 may be of a different diameter as to the main coil 102.

In one or more embodiments, the auxiliary coil 104 may be placed such that a high degree of mutual inductance is achieved between the main coil 102 and the auxiliary coil 104. The auxiliary coil 104 may remain electrically isolated from the main coil 102.

In one or more embodiments, the main coil 102 may be electrically connected to a main circuit of a power transmission device. In one or more embodiments, the auxiliary coil 104 may be electrically connected to an auxiliary circuit of the power transmission device.

Figure 2:
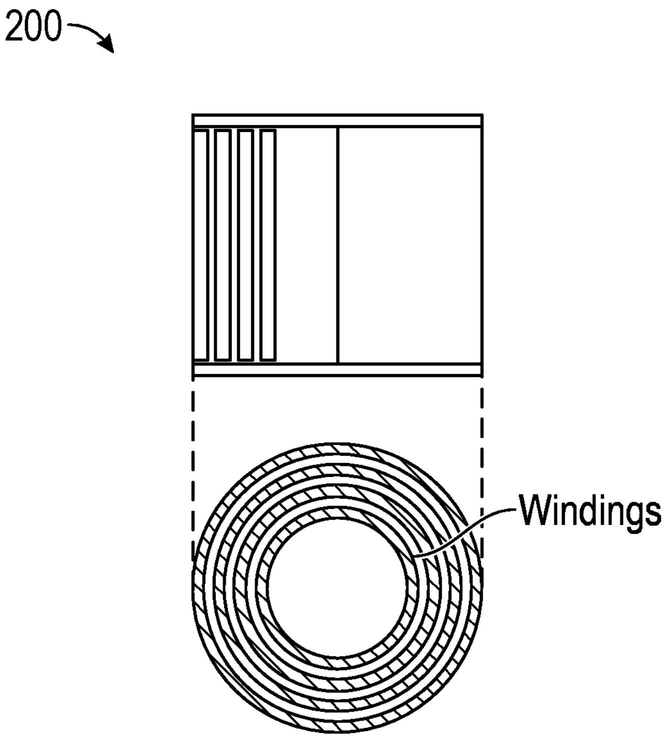
FIG. 2 depicts an example air-core reactor, in accordance with one or more example embodiments of the disclosure.

FIG. 2 depicts an example air-core reactor 200, in accordance with one or more example embodiments of the disclosure.

In one or more embodiments, an air-core reactor 200 may include multiple layers of solenoids in order to form a main coil and an auxiliary coil. In one or more embodiments, as depicted in FIG. 2, windings of a solenoid may be configured such that the windings are concentric.

Figure 3A:
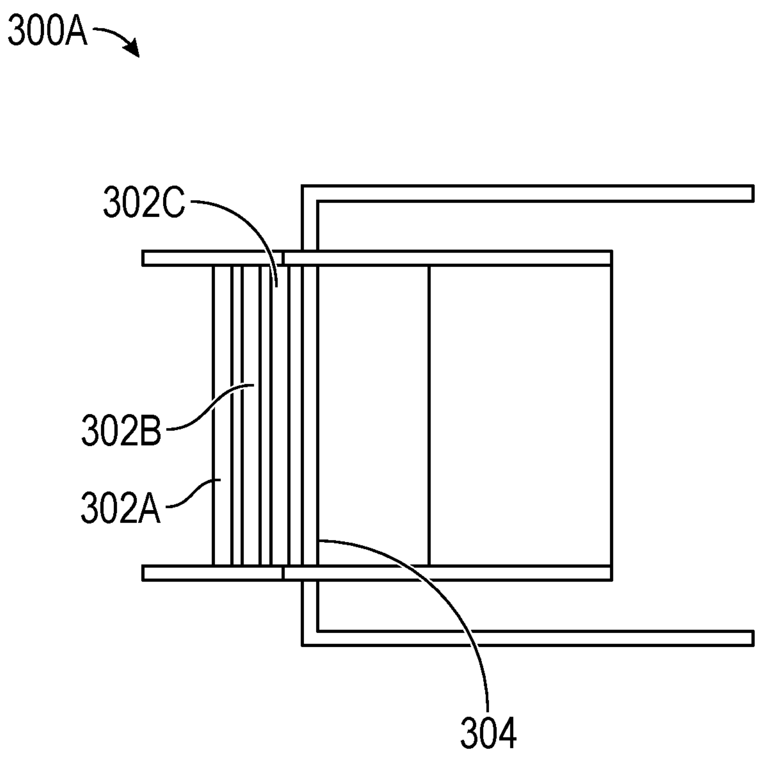
FIG. 3A depicts an example air-core reactor, in accordance with one or more example embodiments of the disclosure.

FIG. 3A depicts an example air-core reactor 300A, in accordance with one or more example embodiments of the disclosure.

In one or more embodiments, the air-core reactor 300A may comprise three solenoids 302A-C connected in parallel to form a main coil, and a fourth solenoid 304 that is isolated from the three solenoids 302A-C in order to form an auxiliary coil. In one or more embodiments, the main coil may have two independent terminals, and the auxiliary coil may have two independent terminals as well.

Figure 3B:
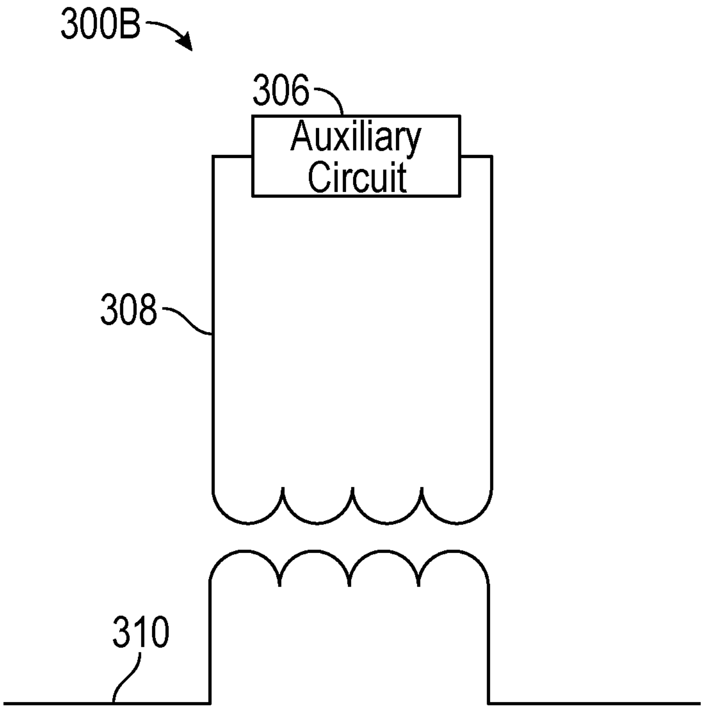
FIG. 3B depicts an example schematic of an auxiliary circuit that is connected to the auxiliary coil, in accordance with one or more example embodiments of the disclosure.

FIG. 3B depicts an example schematic 300B of an auxiliary circuit 306 that is connected to the auxiliary coil, in accordance with one or more example embodiments of the disclosure.

As depicted in FIG. 3B, the auxiliary coil 308 may be isolated from a main coil 310. In one or more embodiments, the auxiliary coil 308 may be magnetically coupled to the main coil 310 in an air-core arrangement without a need for a magnetic iron core.

In one or more embodiments, the equations that apply to the auxiliary circuit are:

$$v_1 = L_1\frac{di_1}{dt} - M\frac{di_2}{dt}$$

$$0 = -M\frac{di_1}{dt} + L_2\frac{di_2}{dt} + v_{aux}$$

In these equations, $i_1$ represents the voltage in the main coil 310, $i_1$ represents the current in the main coil 310, and $i_2$ represents the current in the auxiliary coil 308. $L_1$ represents the inductance in the main coil 310, $L_2$ represents the inductance in the auxiliary coil 308, and M represents the mutual inductance between the auxiliary coil 308 and the main coil 310. Additionally, $v_{aux}$ represents the voltage across the auxiliary coil 308 and across the auxiliary circuit 306.

Further, the mutual inductance M between the auxiliary coil 308 and the main coil 310 is a function of $L_1$, the inductance in the main coil 310, $L_2$, the inductance in the auxiliary coil 308, and a factor k that varies based on the geometry of the main coil 310 and the auxiliary coil 308. The value of the factor k may vary between 0 and 1.

The mutual inductance M may be expressed as follows:

$$M=\sqrt{L_1L_2k}$$

Figure 4:
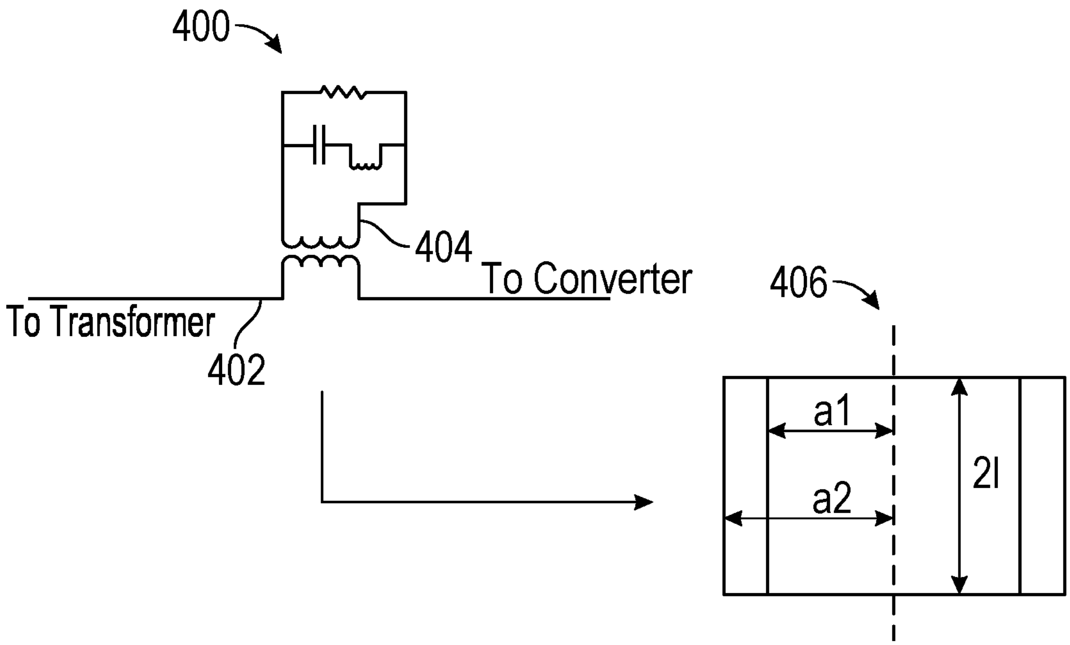
FIG. 4 depicts an example application of an air-core reactor, in accordance with one or more example embodiments of the disclosure.

FIG. 4 depicts an example application 400 of an air-core reactor in accordance with one or more example embodiments of the disclosure.

In one or more embodiments, a main coil 402 of a voltage source converter (VSC) valve reactor may be connected to a converter transformer at one terminal and a VSC at another terminal. An auxiliary coil 404 may be configured to function as a damping coil.

In one or more embodiments, the auxiliary coil 404 may be connected to a band-pass filter for harmonic filtering in voltage source converters. In one embodiment, as depicted in FIG. 4, the band-pass filter may comprise at least a resistor and a capacitor connected in parallel. In another embodiment, although not depicted in FIG. 4, the band-pass filter may comprise at least a resistor and a capacitor connected in series.

In one or more embodiments, a mutual inductance M associated with the main coil 402 and the auxiliary coil 404 may be determined based on variables depicted in schematic 406. In the schematic 406, l represents half of the height of the coil (the auxiliary coil 404 or the main coil 402). Additionally, $a_1$ represents the radius of each winding of the auxiliary coil 404 (or the average radius for multiple windings of the auxiliary coil 404 arranged in parallel), and $a_2$ represents the radius of each winding of the main coil 402 (or the average radius for multiple windings of the main coil 402 arranged in parallel). Further, $n_1$ represents the number of turns associated with the auxiliary coil 404, and $n_2$ represents the number of turns associated with the main coil 402.

In one or more embodiments, the mutual inductance M may be calculated with the following equation:

$$M := \frac{4\cdot\pi\cdot n1\cdot n2\cdot(a1\cdot a2)^2}{10^6}\cdot\left[\sum_{i=0}^{3}\left[\int_0^{\pi}\frac{(-1)^i-\sin(\varphi)^2\cdot\sqrt{a1^2+a2^2-2\cdot a1\cdot a2\cdot\cos(\varphi)+(c_{i,0})^2}}{\left(a1^2+a2^2-2\cdot a1\cdot a2\cdot\cos(\varphi)\right)}d\varphi\right]\right],$$

$$c := \begin{pmatrix} 2\cdot 1 \\ 0 \\ -2\cdot 1 \\ 0 \end{pmatrix}$$

In these equations, the vector c represents a vector of distances between the center of the auxiliary coil 404 and the main coil 402.

Figure 5:
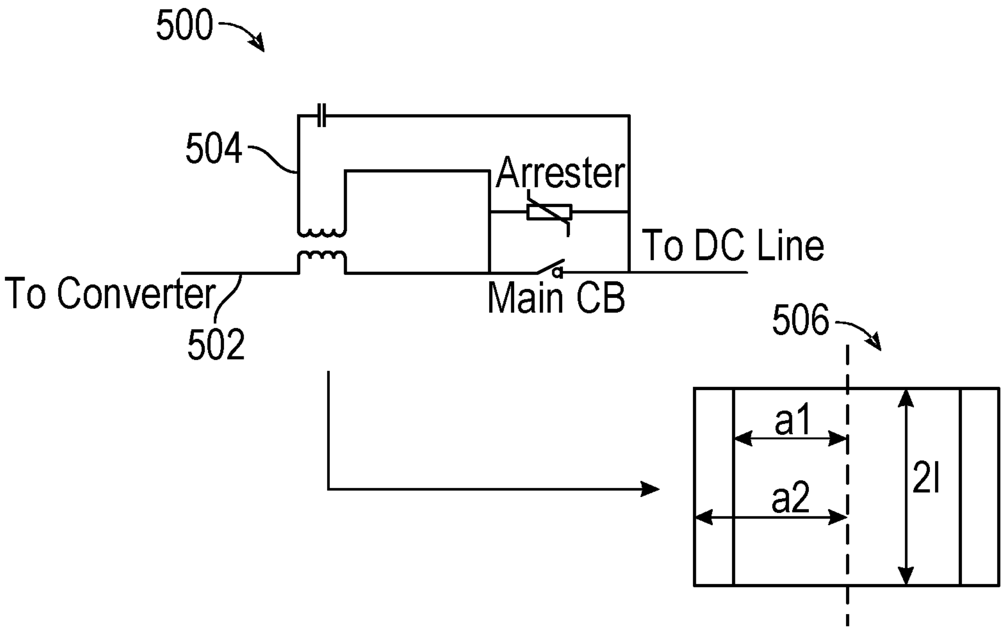
FIG. 5 depicts an example application of an air-core reactor, in accordance with one or more example embodiments of the disclosure.

FIG. 5 depicts an example application 500 of an air-core reactor in accordance with one or more example embodiments of the disclosure.

In one or more embodiments, a main coil 502 of a VSC valve reactor may be connected to a voltage source converter at one terminal and a DC line at another terminal. In some embodiments, a main circuit breaker can be disposed between the main coil 502 and the DC line. An auxiliary coil 504 may be connected to an auxiliary circuit. In some embodiments, the auxiliary circuit may include an LC circuit that is connected across a main circuit breaker. For example, as depicted in FIG. 5, the LC circuit may comprise at least a resistor and an arrester connected in parallel to the main circuit breaker. In such a circuit, a voltage may be induced in the auxiliary circuit to generate current oscillations that may oppose a fault current traveling through the main circuit breaker, thus allowing for zero crossing to interrupt an arc in the main circuit breaker.

In one or more embodiments, a mutual inductance M associated with the main coil 502 and the auxiliary coil 504 may be determined based on variables depicted in schematic 506. In the schematic 506, l represents half of the height of the coil (the auxiliary coil 504 or the main coil 502). Additionally, $a_1$ represents the radius of each winding of the auxiliary coil 504 (or the average radius for multiple windings of the auxiliary coil 504 arranged in parallel), and $a_2$ represents the radius of each winding of the main coil 502 (or the average radius for multiple windings of the main coil 502 arranged in parallel). Further, $n_1$ represents the number of turns associated with the auxiliary coil 504, and $n_2$ represents the number of turns associated with the main coil 502.

In one or more embodiments, the mutual inductance M may be calculated with the following equation:

$$M := \frac{4\cdot\pi\cdot n1\cdot n2\cdot(a1\cdot a2)^2}{10^6}\cdot\left[\sum_{i=0}^{3}\left[\int_0^{\pi}\frac{(-1)^i-\sin(\varphi)^2\cdot\sqrt{a1^2+a2^2-2\cdot a1\cdot a2\cdot\cos(\varphi)+(c_{i,0})^2}}{\left(a1^2+a2^2-2\cdot a1\cdot a2\cdot\cos(\varphi)\right)}d\varphi\right]\right].$$

-continued $$c := \begin{pmatrix} 2\cdot 1 \\ 0 \\ -2\cdot 1 \\ 0 \end{pmatrix}$$

In these equations, the vector c represents a vector of distances between the center of the auxiliary coil 504 and the main coil 502.

Figure 6:
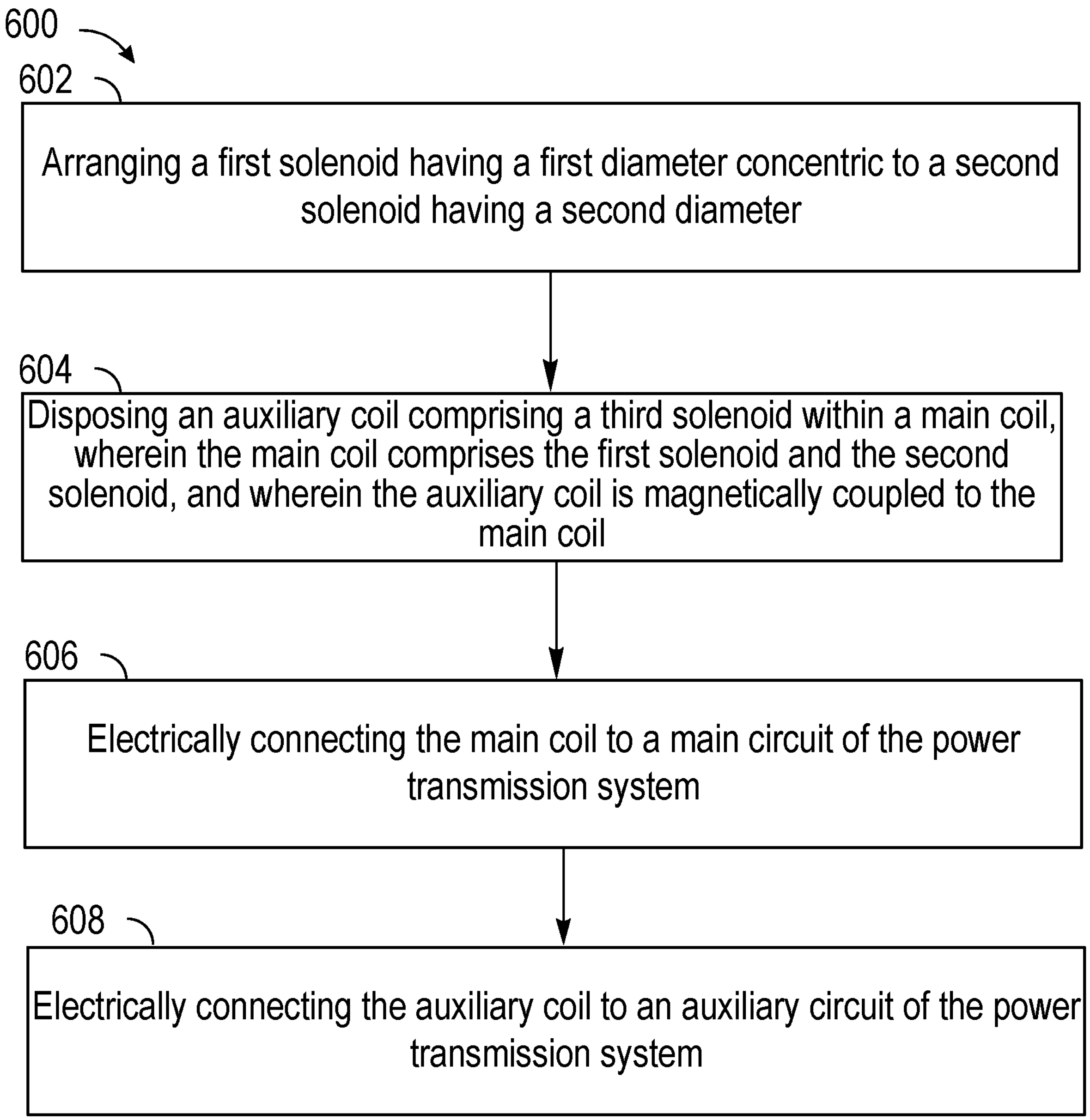
FIG. 6 is an example process flow diagram of an illustrative method, in accordance with one or more example embodiments of the disclosure.

FIG. 6 is an example process flow diagram of an illustrative method 600. At block 602, the method 600 may include arranging a first solenoid having a first diameter concentric to a second solenoid having a second diameter. At block 604, the method 600 may include disposing an auxiliary coil comprising a third solenoid within a main coil, wherein the main coil comprises the first solenoid and the second solenoid, and wherein the auxiliary coil is magnetically coupled to the main coil. At block 606, the method 600 may include electrically connecting the main coil to a main circuit of the power transmission system. At block 608, the method 600 may include electrically connecting the auxiliary coil to an auxiliary circuit of the power transmission system.

In one or more embodiments, the first diameter and the second diameter may be different. In one or more embodiments, the first solenoid and the second solenoid are arranged concentrically. In one or more embodiments, the auxiliary coil is arranged concentric to the main coil.

In one or more embodiments, the main coil may further comprise a fourth solenoid having a third diameter. The first diameter, the second diameter, and the third diameter may be different. The first solenoid, the second solenoid, and the fourth solenoid may be arranged concentrically.

In one or more embodiments, the auxiliary circuit may comprise a band-pass filter configured to provide harmonic damping to a voltage source converter that is electrically connected to the main circuit of the power transmission system.

In one or more embodiments, the auxiliary circuit may comprise an LC circuit connected across a main circuit breaker.

In one or more embodiments, the auxiliary coil may be electrically isolated from the main coil.

The operations described and depicted in the illustrative process flow of FIG. 6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 6 may be performed. For example, in some embodiments, a fourth solenoid may be arranged concentric to the first solenoid and the second solenoid.

One or more operations of the process flow of FIG. 6 may have been described above as being performed manually or by a user device, or more specifically, by one or more program modules, applications, or the like executing on a device. It should be appreciated, however, that any of the operations of process flow of FIG. 6 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

It is understood that the above descriptions are for purposes of illustration and are not meant to be limiting.

Although specific embodiments of the disclosure have been described, numerous other modifications and embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

That which is claimed is:

1. An air-core reactor comprising:

a main coil electrically connected to a main circuit of a power transmission system, the main coil comprising:

a first solenoid having a first diameter; and a second solenoid having a second diameter, wherein the first diameter and the second diameter are different; and an auxiliary coil comprising a third solenoid, wherein the auxiliary coil is electrically connected to an auxiliary circuit of the power transmission system, wherein the main circuit is connected to first devices, wherein the auxiliary circuit is connected to lower power devices than the first devices, wherein the first solenoid and the second solenoid are arranged concentrically, wherein the auxiliary coil is magnetically coupled to the main coil, and wherein the auxiliary coil is arranged concentric to the main coil.

2. The air-core reactor of claim 1, wherein the main coil further comprises: a fourth solenoid having a third diameter, wherein the first diameter, the second diameter, and the third diameter are different.

3. The air-core reactor of claim 2, wherein the first solenoid, the second solenoid, and the fourth solenoid are arranged concentrically.

4. The air-core reactor of claim 1, wherein the auxiliary circuit comprises a band-pass filter configured to provide harmonic damping to a voltage source converter that is electrically connected to the main circuit of the power transmission system.

5. The air-core reactor of claim 1, wherein the auxiliary circuit comprises an LC circuit connected across a main circuit breaker.

6. The air-core reactor of claim 1, wherein the auxiliary coil is electrically isolated from the main coil.

7. The air-core reactor of claim 1, wherein the lower power devices are electrically isolated from the main coil.

8. A system comprising:

a power transmission system, the power transmission system comprising an air-core reactor comprising:

a main coil electrically connected to a main circuit of a power transmission system, the main coil comprising:

a first solenoid having a first diameter; and a second solenoid having a second diameter, wherein the first diameter and the second diameter are different; and an auxiliary coil comprising a third solenoid, wherein the auxiliary coil is electrically connected to an auxiliary circuit of the power transmission system, wherein the main circuit is connected to first devices, wherein the auxiliary circuit is connected to lower power devices than the first devices, wherein the first solenoid and the second solenoid are arranged concentrically, wherein the auxiliary coil is magnetically coupled to the main coil, and wherein the auxiliary coil is arranged concentric to the main coil.

9. The system of claim 8, wherein the main coil further comprises:

a fourth solenoid having a third diameter, wherein the first diameter, the second diameter, and the third diameter are different.

10. The system of claim 9, wherein the first solenoid, the second solenoid, and the fourth solenoid are arranged concentrically.

11. The system of claim 8, wherein the auxiliary circuit comprises a band-pass filter configured to provide harmonic damping to a voltage source converter that is electrically connected to the main circuit of the power transmission system.

12. The system of claim 8, wherein the auxiliary coil is electrically isolated from the main coil.

13. The system of claim 8, wherein the lower power devices are electrically isolated from the main coil.

14. A method of implementing an air-core reactor in a power transmission system, comprising:

arranging a first solenoid having a first diameter concentric to a second solenoid having a second diameter;

disposing an auxiliary coil comprising a third solenoid within a main coil, wherein the main coil comprises the first solenoid and the second solenoid, and wherein the auxiliary coil is magnetically coupled to the main coil;

electrically connecting the main coil to a main circuit of the power transmission system; and electrically connecting the auxiliary coil to an auxiliary circuit of the power transmission system, wherein the auxiliary coil is electrically connected to an auxiliary circuit of the power transmission system, wherein the main circuit is connected to first devices, and wherein the auxiliary circuit is connected to lower power devices than the first devices.

15. The method of claim 14, wherein the main coil further comprises:

a fourth solenoid having a third diameter, wherein the first diameter, the second diameter, and the third diameter are different.

16. The method of claim 15, wherein the first solenoid, the second solenoid, and the fourth solenoid are arranged concentrically.

17. The method of claim 14, wherein the auxiliary circuit comprises a band-pass filter configured to provide harmonic damping to a voltage source converter that is electrically connected to the main circuit of the power transmission system.

18. The method of claim 14, wherein the auxiliary coil is electrically isolated from the main coil.

19. The method of claim 14, wherein the lower power devices are electrically isolated from the main coil.

* * * * *